United States Patent [19]

Hiyama et al.

[11] 4,291,526
[45] Sep. 29, 1981

[54] METHOD AND APPARATUS FOR HARVESTING FRUIT FROM A ROW CROP TRAINED ON TRELLIS WIRES OR THE LIKE

[75] Inventors: Kazuo Hiyama; Howard K. Hiyama, both of Fowler, Calif.

[73] Assignee: Hiyama Farms, Inc., Fowler, Calif.

[21] Appl. No.: 80,007

[22] Filed: Sep. 28, 1979

Related U.S. Application Data

[63] Continuation-in-part of Ser. No. 844,147, Oct. 21, 1977, Pat. No. 4,255,922.

[51] Int. Cl.³ .......................................... A01D 46/00
[52] U.S. Cl. .......................................... 56/330
[58] Field of Search .................. 56/328, 328 TS, 330, 56/1

[56] References Cited

U.S. PATENT DOCUMENTS

| 2,925,687 | 2/1960 | Pronio et al. | 56/328 R |
| 3,439,482 | 4/1969 | Orton | 56/330 |
| 3,774,381 | 11/1973 | Burton | 56/330 |
| 4,022,001 | 5/1977 | Burton | 56/330 |
| 4,198,801 | 4/1980 | Claxton | 56/330 |

FOREIGN PATENT DOCUMENTS 491348 7/1976 U.S.S.R. .......................... 56/330

Primary Examiner—Robert A. Hafer
Attorney, Agent, or Firm—Huebner & Worrel

[57] ABSTRACT

A method for harvesting fruit from a row crop trained on a trellis wire and an apparatus having a vehicle adapted for earth traversing movement along a row crop supported on a trellis wire, a striking member having an end portion, an assembly mounting the striking member on the vehicle with said end portion disposed for movement with the vehicle along a course adjacent to the trellis wire and for reciprocal movement in a path to and from engagement with the trellis wire, and a mechanism connected in driving relation to the striking member for reciprocating the striking member to move the end portion thereof in the path repeatedly to strike the trellis wire to shake the fruit from the row crop.

5 Claims, 6 Drawing Figures

METHOD AND APPARATUS FOR HARVESTING FRUIT FROM A ROW CROP TRAINED ON TRELLIS WIRES OR THE LIKE

CROSS REFERENCE TO A RELATED APPLICATION

This application is a continuation-in-part of copending United States Patent Application, Ser. No. 844,147, filed Oct. 21, 1977, and entitled "Method And Apparatus For Use In Drying And Harvesting Vine Borne Crops And Performing Other Work Operations", now U.S. Pat. No. 4,255,922.

BACKGROUND OF THE INVENTION

1. Field of the Invention

The present invention relates to a method and apparatus for havesting fruit from a row crop trained on trellis wires or the like and more particularly to such a method and apparatus which have particular utility in the harvesting of grapes in both vine dried and undried form which have been trained and cultured in accordance with the method of the Applicants' invention.

2. Description of the Prior Art

As illustrated by the Fisher, et al. U.S. Pat. No. 3,601,964, it has been known to use batons or beater rods to strike trellis wires in an effort to dislodge vine borne crops trained along the wires. This practice has been less than successful for a variety of reasons including the inadequacies residing in the manner in which the vines are trained in such prior art practices.

The primary difficulties, however, result from the manner in which the striking force is applied to the trellis wires as well as in the proclivity for the batons to become entangled in the canes and foliage of the vines during continuous movement along the row. Where such entanglement occurs, the apparatus must ordinarily be stopped to permit disentanglement of the canes and batons in order to avoid ripping out the vines or otherwise seriously damaging the row crop and/or the apparatus. To a degree, two conflicting objectives are encountered. On the one hand, it may be desirable to have pronounced movement of the batons in order to impart the optimum striking force to the trellis wires. On the other hand, it is desirable to have only quite limited movement of the batons in order to minimize the propensity for entanglement. Heretofore, these conflicting objectives have prevented practical utilization of such prior art concepts.

Therefore, it has long been known that it would be desirable to have a method and apparatus for harvesting fruit from a row crop trained on trellis wires or the like in which the striking force was applied to the trellis wires with optimum effectiveness in dislodging the crop from the vines while minimizing the likelihood of entanglement in the canes and foliage of the row crop or causing other damage to the row crop, fruit, trellis wires, trellises or apparatus.

SUMMARY OF THE INVENTION

Therefore, it is an object of the present invention to provide an improved method and apparatus for harvesting fruit from a row crop trained on trellis wires or the like.

Another object is to provide such a method and apparatus which have particular utility when used in conjunction with the method and apparatus of the Applicants' co-pending United States Patent Application Ser. No. 844,147, filed Oct. 21, 1977, and entitled "Method And Apparatus For Use In Drying And Harvesting Vine Borne Crops And Performing Other Work Operations".

Another object is to provide such a method and apparatus which can be employed to harvest fruit from row crops trained on trellis wires where the fruit has been vine dried as well as to harvest such fruit where no such drying has taken place.

Another object is to provide such a method and apparatus in which the heretofore conflicting objectives of applying the optimum harvesting force to the trellis wires and avoiding entanglement in canes and foliage of the row crop are achieved in a manner fully effective in the harvesting of such fruit.

Another object is to provide such a method and apparatus which are particularly well suited to use on gravevines trained along trellis wires in accordance with the Applicants' invention.

Another object is to provide such an apparatus which possesses a simplicity of structure and dependability of operation not heretofore achieved in the art.

Another object is to provide such an apparatus wherein the harvesting force can be applied with little or no damage to the harvested fruit and leaves the row crop substantially free of injury for the next growing season.

Another object is to provide such an apparatus which applies the striking force to the trellis wires in a slapping action and which operates automatically to free itself from resistance encountered during operation so as to minimize damage to the row crop, trellis structure and the apparatus itself.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 6 is a plane view of a portion of the striking member taken on line 6—6 in FIG. 4.

DESCRIPTION OF THE PREFERRED EMBODIMENT

Figure 1:
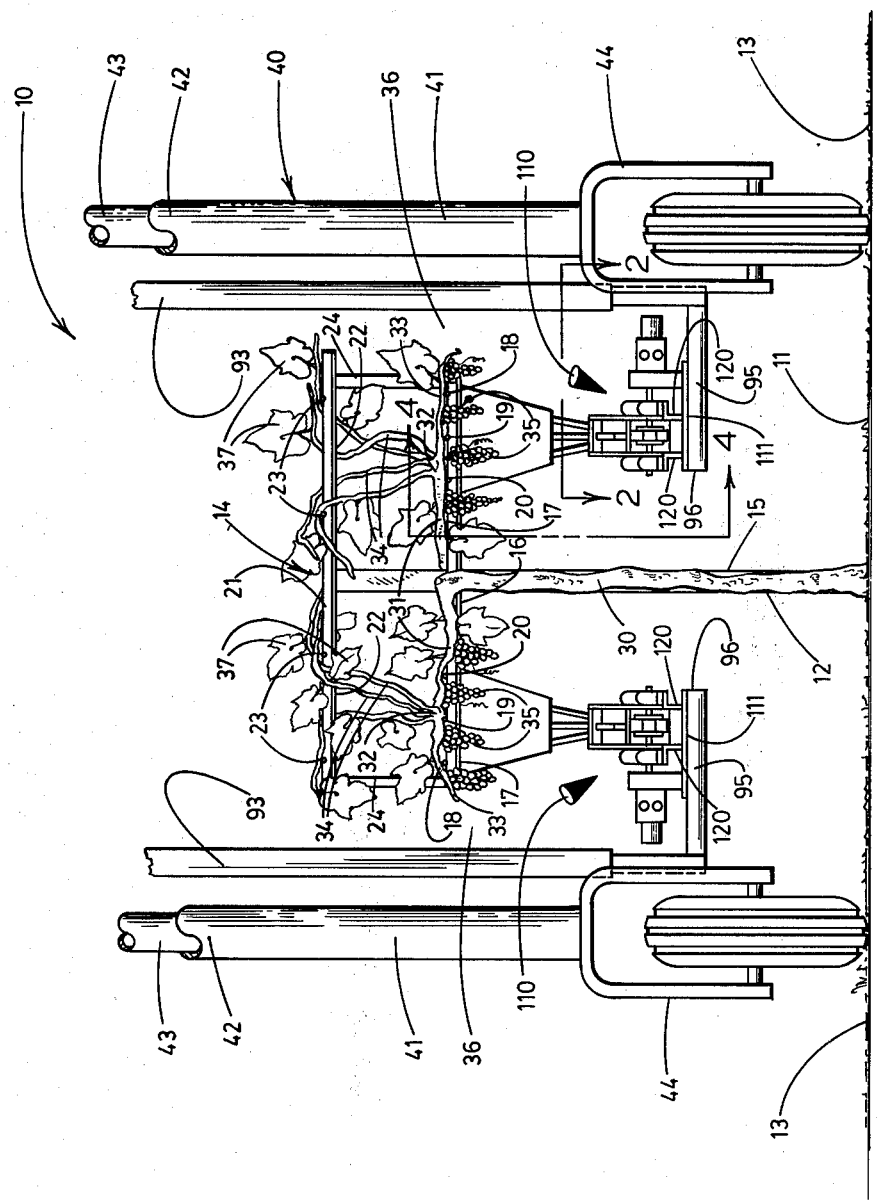
FIG. 1 is a fragmentary front elevation of the apparatus of the present invention shown in a typical operative environment.

Referring more particularly to the drawings, the apparatus of the present invention is generally indicated by the numeral 10 in FIG. 1. The apparatus is shown disposed on the earth surface 11 above a row of grapevines 12. In the normal fashion, rows of grapevines are separated from each other by paths or spaces 13 between the rows along which the apparatus is adapted to move, as will hereinafter be described.

In accordance with the method of the present invention, each row of grapevines 12 is trained and grown in a manner herein described and shown in FIG. 1. Grapevines trained in accordance with this method bear some visual similarity to those disclosed in the Hiyama U.S. Pat. No. 3,564,856. However, in the method of the present invention, each row of grapevines is composed of and supported by a plurality of trellises or supports 14. Each support has a substantially vertical member or stake 15 which is secured in upright relation in the earth. A lower cross piece 16 is affixed on each support in substantially horizontal relation and normal to the vertical member. The lower cross pieces are disposed at substantially common elevations on their respective supports and are individually composed of arm portions 17 extending on opposite sides of their vertical member. Corresponding arm portions of the lower cross pieces of each row are interconnected by an outer trellis wire 18, a central trellis wire 19 and an inner trellis wire 20. These trellis wires are disposed in spaced, substantially parallel relation and are strung so as to be under moderate tension.

Each support has an upper cross piece 21 individually secured thereon above and substantially parallel to the lower cross piece 16 thereof. The upper cross piece is composed of arm portions 22 individually extending on opposite sides of the support. Corresponding arm portions of the upper cross pieces of the supports in a row are interconnected by a pair of spaced, substantially parallel upper trellis wires 23. The arm portions 17 and 22 on each side of each support are interconnected by vertical braces 24 which assist in maintaining the rigidity of each support.

A grapevine 30 is grown on each side of each support 14 within each row of grapevines 12. Thus, a pair of grapevines are provided individual to each support with the grapevines being substantially aligned longitudinally in the row. Each grapevine is trained to grow so as to form an upper, laterally directed portion 31 extending outwardly from the vertical member 15 along one of the arm portions 17 of the lower cross pieces 16. Thus, the portions 31 of the grapevines of each support extend in opposite directions from the vertical member and on opposite sides thereof. The portion 31 of each grapevine terminates in a head 32 adjacent to the central trellis wire 19 of its respective arm portion 17. The head of each grapevine produces canes 33 which are tied tightly on and trained to grow along their respective central trellis wire. The canes are preferably trained to grow along the central trellis wire in a direction away from the arm portion 17 so that the corresponding canes 33 of the respective grapevines of each support extend in opposite directions from the support. The canes 33 produce a plurality of secondary canes 34 which, in accordance with the method hereof, are laid outwardly on opposite sides of each central trellis wire and over the inner and outer trellis wires 20 and 18 respectively. Other of the secondary canes are laid over the upper trellis wires 23. The particular, a secondary cane which appears suitable for use as a cane to be trained along the central trellis wire during the next growing season and which is near the head 32 of the grapevines is laid over the upper trellis wires from each grapevine.

This method for training the growth of the grapevines 30 causes the vines to produce bunches of grapes 35 nearly all of which are suspended from the canes in a common zone or path 36 between the vertical member 15 and the remote end of the arm portion 17 and within a vertical distance of approximately twelve inches from the arm portion. Furthermore, the foliage 37 grown by the grapevines is substantially all supported above the bunches of grapes, as shown in FIG. 1, trained upon and supported by the upper trellis wires 23. Thus, the bunches of grapes are exposed from beneath the arm portions.

The apparatus 10 has a vehicle or mobile frame 40 of any suitable type. A vehicle of the type described in the Applicants' co-pending patent application heretofore identified is excellently suited to the purpose. As shown in FIG. 1, the vehicle has a pair of front vertical corner members 41 which are disposed in substantially parallel vertical attitudes and constitute the front corners or forward portions of the frame. The corner members have upper ends 42 and have steering shafts 43 individually rotationally extended through the corner members longitudinally thereof. Each steering shaft 43 mounts a front wheel assembly 44 on the lower end thereof for ground engagement. The upper ends 42 of the corner members are interconnected by a front cross beam, not shown. It will be understood that the vehicle possesses four wheel assemblies to support the vehicle for earth traversing movement and has suitable drive and control systems for independent operation in movement along a row of grapevines 12.

As in the vehicle of the co-pending patent application to which reference has previously been made, the vehicle 40 has a pair of vertical members 93 secured on the vehicle and vertically suspended therefrom. The pair of vertical members constitute portions of opposed parts of a subframe borne by the vehicle and are preferably of tubular construction. Each of the vertical members has an "L" shaped forward arm 95 slidably mounted for vertical adjustment in its respective vertical member. The lower portion of each forward arm extends in right angular relation to its respective vertical member and toward the center of the vehicle. Thus, these lower portions extend transversely of the intended direction of travel of the vehicle, as best shown in FIG. 1, to inwardly extending remote ends 96. Preferably the arms 95 are vertically adjustable in their respective vertical members, by any suitable mechanism, for precise elevational positioning of the remote ends 96.

It will be understood that the vehicle 40 can have any suitable support systems for collecting the fruit during the harvesting operation and for conveying to a central location. The systems shown in the Applicants' aforementioned co-pending patent application are excellently suited to the purpose.

The harvesting assembly of the apparatus of the present invention is generally indicated by the numeral 110 in the drawings. In use with grapevines trained on the trellises 14 heretofore described, typically a pair of the harvesting assemblies 110 are mounted on the vehicle 40 in the arrangement shown in FIG. 1. Each harvesting assembly has a base plate 111 which is secured, as by welding, on one of the front arms 95 adjacent to the remote end 96 thereof. The harvesting assemblies are preferably mounted on their respective front arms in the relationship shown best in FIG. 1 wherein a harvesting assembly is disposed on each side of the row 12 during passage along the row of grapevines 12. Each harvesting assembly is located beneath the trellis wires 18, 19 and 20 on its respective side of the row.

The base plate 111 of each harvesting assembly 110 has a forward edge 112 and a rearward edge 113 relative to the intended direction of travel of the apparatus 10 along the row of grapevines 12. A diagonal brace 114 is affixed on the front arm so as to interconnect the front arm 95 and the rearward edge 113 of the base plate in supporting relation.

A pair of angle iron supports 120 are mounted, as by welding, on the base plate 111 in inverted relation extending in spaced substantially parallel relation to each other and the intended direction of travel of the vehicle 40, as best shown in FIG. 1. The supports 120 have upper surfaces 121 which define a substantially horizontal plane and the supports bound a space 122 therebetween. A forward plate 123 is fastened on the forward edge 112 of the base plate and the ends of the angle iron supports immediately thereabove.

Figure 2:
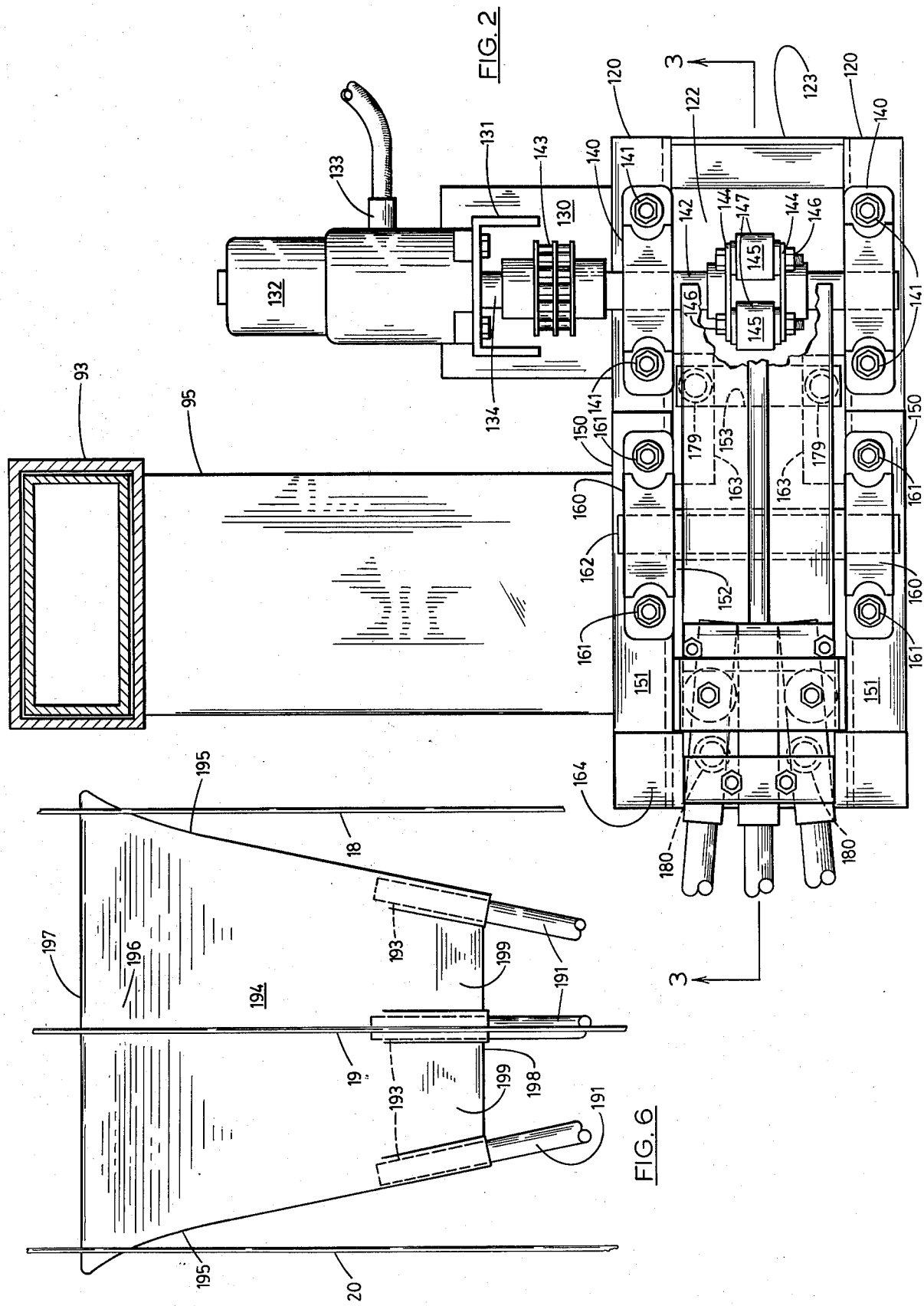
FIG. 2 is a somewhat enlarged, fragmentary horizontal section taken on line 2—2 in FIG. 1.

A motor support plate 130 is secured, as by welding, on the pair of angle iron supports 120 disposed in substantially right angular relation thereto, parallel to its respective front arm 95 and forwardly thereof relative to the intended direction of travel of the apparatus 10. A channel member 131 is borne by the motor support plate upstanding relation normal to the support plate and spaced from the angle iron supports, as best shown in FIGS. 1 and 2. An hydraulic motor 132 is mounted on the channel member in a predetermined position spaced upwardly from the support plate 130. The hydraulic motor has a pair of supply hoses 133 which connect with a suitable hydraulic system, not shown, for driving the hydraulic motor in the conventional manner. The hydraulic motor has an output shaft 134 which is extended through the channel member and adapted to be driven by the hydraulic motor in rotational movement.

A pair of bearings 140 are individually mounted on the upper surfaces 121 of the angle iron supports 120 by bolt and nut assemblies 141. The bearings are oriented so as to be in axial alignment with the output shaft 134 of the hydraulic motor 132. A shaft 142 is received for rotational movement in the bearings 140 in axial alignment with the output shaft 134 of the hydraulic motor. A coupler 143, such as one of the chain type shown in FIG. 2, interconnects the shaft 142 with the output shaft 134 so that operation of the hydraulic motor causes rotation of the shaft 142 within the bearings 140.

A pair of spaced, substantially parallel roller plates 144 are secured on the shaft 142 in substantially right angular relation to the shaft and extending into the space 122 defined by the angle iron supports 120. Four rollers 145 are fastened on the roller plates by mounting assemblies 146. The rollers are mounted by the mounting assemblies for rotational movement about individual axes of rotation adjacent to the individual corners of the plates parallel to the shaft 142. Each of the rollers has a peripheral surface which extends outwardly from the roller plates, as can perhaps best be seen in FIGS. 2 and 3. Thus, it will be seen that the hydraulic motor 132 is operable to rotate the shaft 142 about an axis of rotation substantially normal to the intended direction of travel of the vehicle 40. Similarly, the rollers are individually adapted for free wheeling movement on their respective mounting assemblies about axes of rotation substantially normal to the intended direction of travel of the vehicle and parallel to the axis of rotation of the shaft in substantially equally spaced relation therefrom. This relationship can best be seen in FIG. 3.

Figure 5:
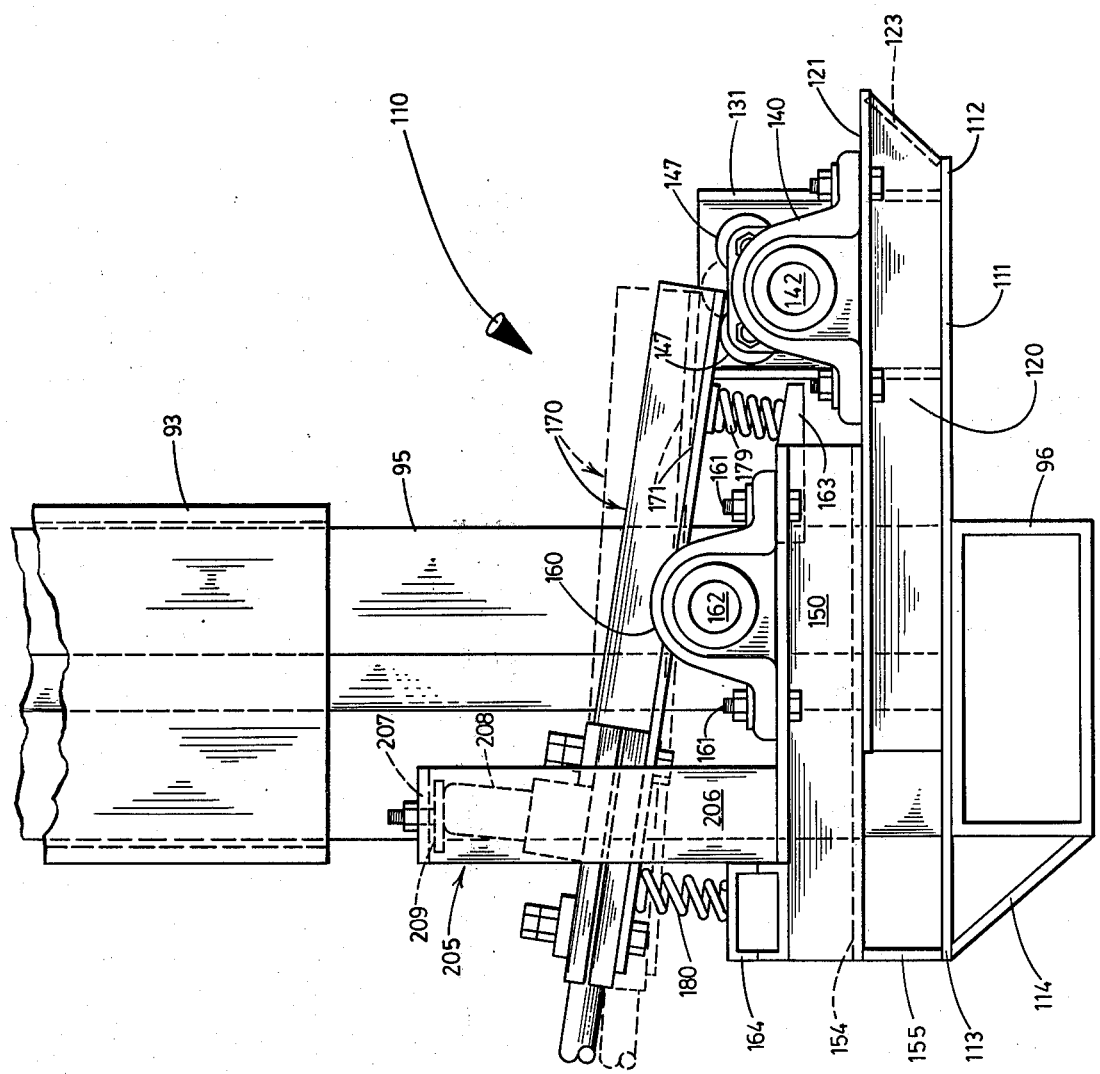
FIG. 5 is a somewhat further enlarged, fragmentary, side elevation of the portion of the apparatus viewed in FIG. 4 showing the striking member thereof in full lines in one operative position and in phantom lines in a second operative position.

A second pair of angle iron supports 150 are individually mounted on the upper surfaces 121 of the first pair of angle iron supports 120. The supports 15 extend rearwardly with respect to the intended direction of travel of the vehicle 40 farther than the supports 120, as can best be seen in FIG. 5. The supports 150 have upper surfaces 151 defining a common substantially horizontal plane. The supports are substantially parallel to each other and have a space 152 therebetween. A channel member 153 is mounted, as by welding on the supports 150 extending therebetween in upwardly facing relation to form a U-shaped configuration. The channel member has a rearward portion 154 extending farther rearwardly than the supports 150. A rearward support plate 155 is mounted on the rearward edge 113 of the base plate 111 and is fastened on the rearward portion 154 of the channel member 153 in supporting relation thereto.

A pair of bearings 160 are mounted on the upper surfaces 151 of the supports 150 by bolt and nut assemblies 161. The bearings are mounted in axial alignment to define an axis substantially parallel to the shaft 142 of the bearings 140. A shaft 162 is rotationally received in the bearings 160 parallel to shaft 142. A pair of spring mounting plates 163 are weldably secured on each of the supports 150 in predetermined positions extending to positions midway between the shafts 142 and 162, as best shown in hidden lines in FIG. 2. A spring support 164 is affixed on the rearward portion 154 of the channel member 153 oriented so as to be substantially parallel to the shafts 142 and 162.

Each harvesting assembly 110 has a striking member 170 mounted for pivotal movement on the shaft 162 thereof. The striking member has a main plate 171 having a sleeve 172 affixed as by welding thereon and locked on the shaft 162 for rotational movement therewith by a key 173. The main plate 171 has a forward portion 174 adjacent to the rollers 145 and a rearward portion 175 above the spring support 164. The main plate has a lower surface 176 extending to a position so as to be engageable with the peripheral surface 147 of one roller at a time, during rotation of the shaft 142, as can best be visualized in FIG. 5. The main plate has an upper surface 177 on which is mounted a brace 178 to reinforce the main plate against deformation during use. A pair of forward compression springs 179 interconnect the lower surface 176 of the main plate 171 at the forward portion 174 thereof and the spring mounting plates 163. A pair of rearward compression springs 180 interconnect the spring support 164 and the lower surface 176 of the rearward portion 175 of the main plate. The forward and rearward compression springs serve to prevent pivotal movement of the main plate and shaft 162 beyond certain extremes in each direction of movement and to stabilize such movement during operation as will hereinafter be described.

Figure 3:
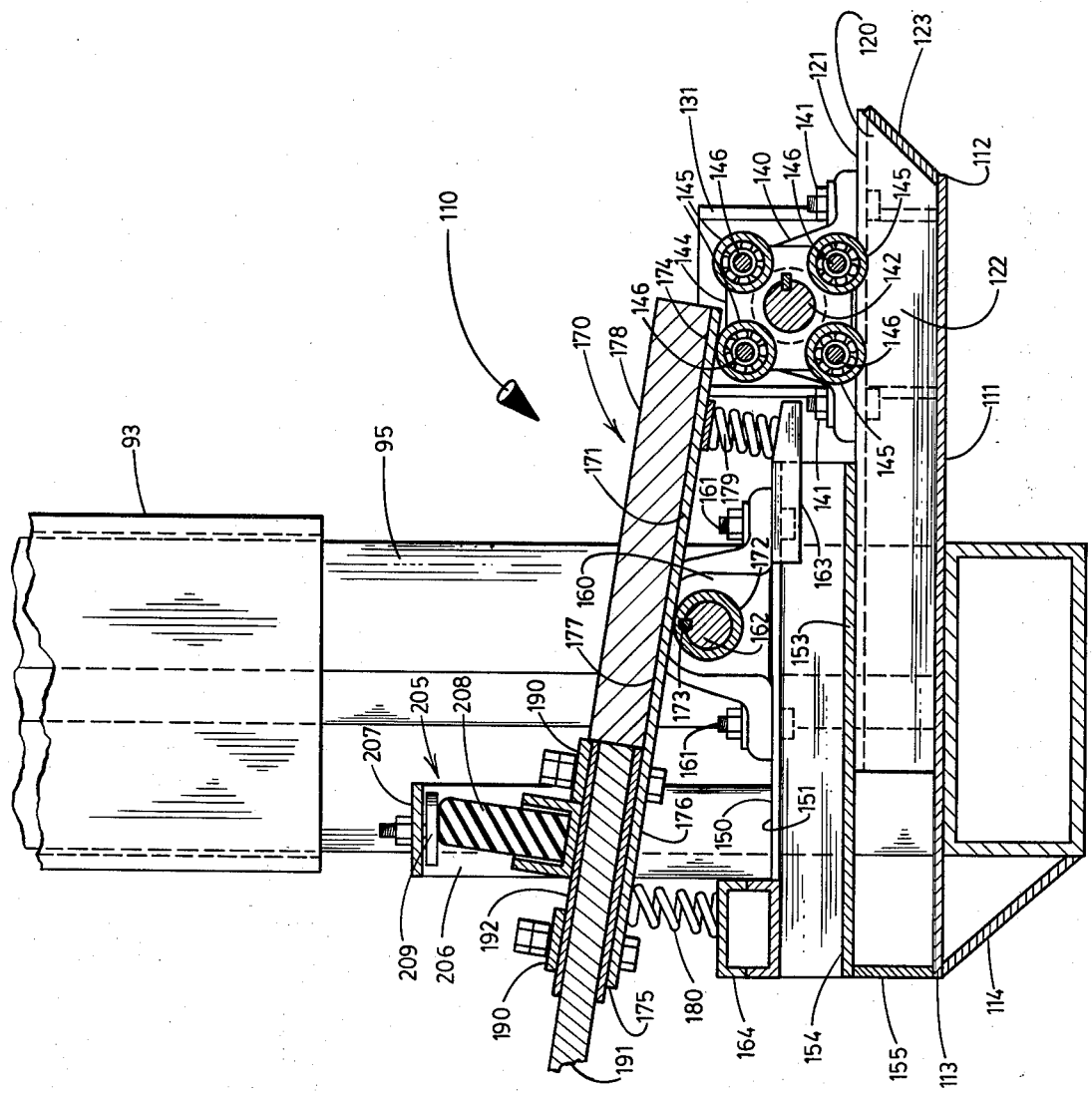
FIG. 3 is a fragmentary, longitudinal vertical section taken from a position indicated by line 3—3 in FIG. 2.

A pair of clamp assemblies 190 are borne by the rearward portion 175 of the main plate 171 in spaced relation to each other, as best shown in FIG. 3. Three semi-flexible rods 191, constituting the semi-flexible portion of each striking member 170, have square tube rod housings 192 fastened on corresponding ends thereof. The rod housings are received in the clamp assemblies 190 in spaced relation and clamped into position using the clamp assemblies. As can best be seen in FIGS. 1, 4 and 6, the rods are of substantial length and are positioned so as to diverage slightly in a rearward direction with respect to the intended direction of travel of the vehicle 40. The rods have remote end portions 193. The rods are of a sufficient length and construction so as to provide limited flexibility during use. Fiberglas rods of the type used in conventional grape harvesters to beat the foliage of the grapevines during harvesting are well suited to this purpose.

A panel 194 is fastened on the remote end portions 193 of the rods 191. The panel has rearwardly divergent marginal edges 195 which lead to an upwardly curved rearward or wire contacting portion 196. The wire contacting portion terminates in an edge 197 extending substantially normal to the intended direction of travel of the vehicle 40. The panel has a leading edge 198. The leading edge is curved downwardly between the rods to form a pair of troughs 199 therebetween.

For purposes of illustrative convenience, it will be understood that the panel 194 constitutes a first end portion of the striking membr 170 and the main plate 171 constitutes a second end portion of the striking member.

A frame 205 is mounted on the supports 150 adjacent to the spring support 164 and extending upwardly from the supports 150. The frame is composed of a pair upright plates 206 individually secured on the supports and extending upwardly therefrom in substantially parallel relation. A cross piece 207 is affixed on the upwardly extending rods of the upright plates and extends therebetween. A cushioning assembly 208, constructed of a resilient material such as rubber, is mounted on the forwardmost clamp assembly 190 beneath the cross piece 207, as best shown in FIG. 3. A pair of pad assemblies 209 are fastened on the cross piece 207 for engagement by the cushioning assembly during operation of the harvesting assembly 110.

OPERATION

The operation of the described embodiment of the subject invention is believed to be clearly apparent and is briefly summarized at this point.

In accordance with the method hereof, grapevines trained in the manner heretofore described are prepared for harvesting of the fruit by a combination of steps dependent upon the condition desired for the fruit at the time of harvest. If drying of the grapes on the grapevines to form raisins is desired, the bunches of grapes 35 are sprayed by or immersed in a fluid, such as a solution of potassium carbonate and methyl oleate, operable to initiate the dehydration process. The next step involves selected pruning of the grapevines 30. This can be accomplished in the method of the present invention by simply severing the canes 33 relatively near the heads 32 of the vines. Since, as previously noted, the method of the present invention preferably, but not necessarily, calls for at least one of the secondary canes 34 near the head 32 of each grapevine to be draped over one of the upper trellis wires 23 for use as a primary cane in the next growing season, the canes 33 are severed beyond this selected cane so as to preserve it for such later use.

If harvesting of non-dehydrated grapes is desired, the spraying or immersing step is not performed. The pruning step set forth above is preferably performed, however. The step is performed approximately one week prior to harvest which achieves some drying of the canes and stems without drying the grapes. The grapes are more easily removed from the grapevines during the harvesting step where this has been done.

The harvesting step of the method of the present invention is performed in exactly the same manner where the grapes have been dried on the grapevines as in the case where the grapes are to be harvested in a non-dried condition. The apparatus 10 is driven to and oriented relative to a row of grapevines 12 and to the trellises 14 thereof as shown in FIG. 1. In this position the apparatus straddles the row and trellises with the panels 194 of the striking members 170 vertically aligned with and beneath the trellis wires 18, 19 and 20 on their respective sides of the row, as best shown in FIGS. 1 and 6.

Using the hydraulic system and drive system, not shown, of the vehicle 40, the apparatus 10 is driven along the row of grapevines 12 with the striking members 170 of the harvesting assemblies 110 in operation. Operation of the harvesting assemblies through the hydraulic system is achieved by driving the hydraulic motors 132 to rotate the shafts 142. Such rotation of the shaft of each harvesting assembly carries the rollers thereof in a clockwise direction, as viewed in FIGS. 3 and 5, so that the rollers are sequentially brought into contact with the lower surface 176 of the main plate 171 of the striking member 170. Such free wheeling or rolling contact with the forward portion 174 of the main plate causes the main plate to be reciprocated or pivoted about the axis of shaft 162 in movement with shaft 162 between the positions shown in full lines in FIG. 5 and the position shown in phantom lines in FIG. 5. Thus, a relatively limited reciprocal movement of the main plate achieved under alternate compression of the forward and rearward compression springs 179 and 180 and the cushioning assembly 208. It will be seen that the forward and rearward compression springs and the cushioning assembly cooperate to stabilize reciprocation of the main plate as well as to limit the length of travel of the main plate in each such reciprocation.

Figure 4:
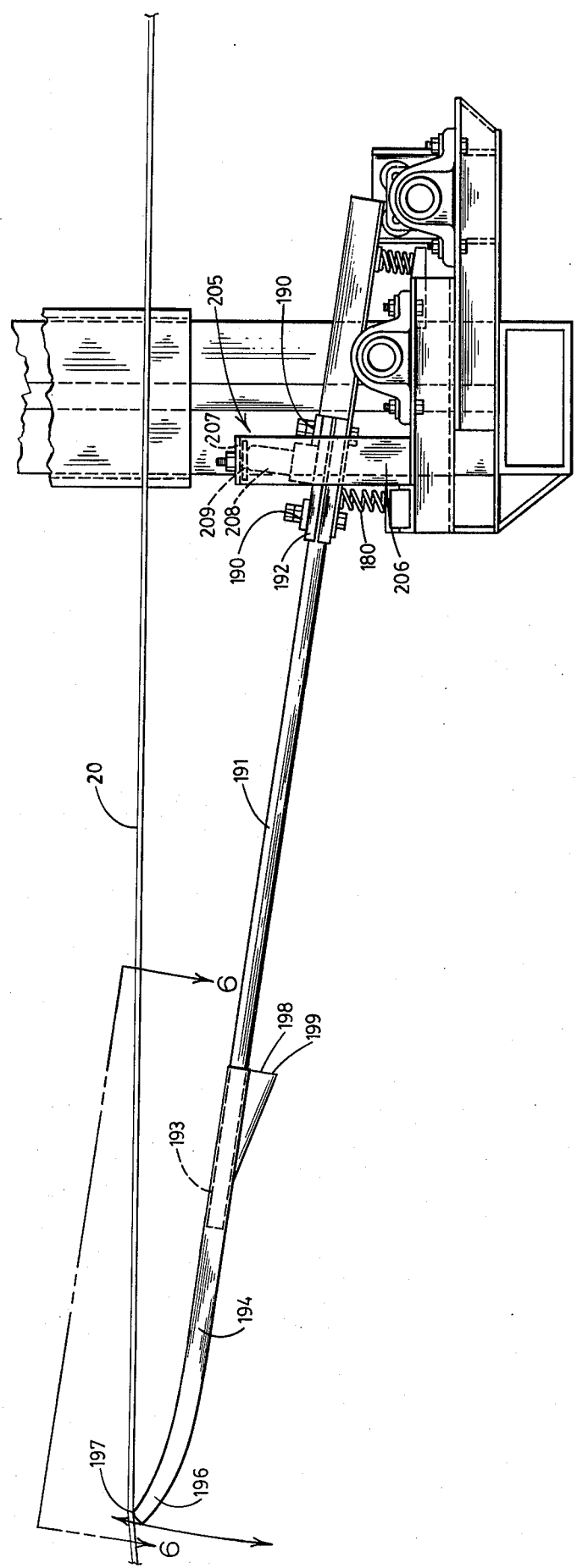
FIG. 4 is a side elvation of a portion of the apparatus taken from a position indicated by line 4—4 in FIG. 1.

As can best be visualized in FIG. 4, such reciprocation of the main plate causes the panel 194 of each striking member 170 to be moved in a similar reciprocal, substantially vertical path to carry the wire contacting portion 196 and more specifically the edge 197 thereof against the trellis wires 18, 19 and 20 in a striking direction and from the trellis wires in an opposite return direction in such reciprocal movement. During such reciprocal movement, the rods flex to a degree so that the motion imparted to the trellis wires is in the nature of a slapping action found particularly effective in transmitting crop dislodging motion to the wires and to the canes 33 trained along those wires. This motion results in the grapes 35 being removed from the canes cleanly, efficiently and with little or no damage to the grapes for collection by any suitable means therebelow.

It has been found that the motion imparted to the trellis wires 18, 19 and 20 is transmitted along the wires as the apparatus 10 moves along the row of grapevines 12. Therefore, the shaking motion of the wires precedes the actual point of contact of the panel with the wires. As a result, it has been found that the grapes are virtually all removed from the vines approximately one foot or more in advance of the points of contact with the wires. Accordingly, all of the grapes are removed from the canes before any portion to the harvesting assembly can make contact with the grapes. Thus, the grapes are removed with virtually no damage to the grapes or to the grapevines.

As previously noted, the apparatus of the present invention is particularly well suited to the harvesting of grapevines trained in accordance with the method of the Applicants' invention as heretofore set forth. This is true because the grapes borne by grapevines trained in this manner are suspended from the trellis wires 18, 19 and 20 while the foliage 37 is supported by the upper trellis wires 23. Thus, the foliage and canes do not interfere with transmission of the harvesting force to the grapes. Still further, the quite limited movement of the striking members 170, the upward and rearward incline of the striking members, the upward extension of the edges 197 of the panels and the rearwardly divergent configuration of the striking members cooperate during operation to minimize any tendency for the striking member to become entangled in the canes and foliage of the grapevines.

As can perhaps best be visualized in FIG. 4, the flexing of the rods 191 causes the limited reciprocal movement of the main plate 171 of each striking member 170 to be amplified. This factor coupled with the distance of the edge 197 from the shaft 162 about which the striking member 170 is pivoted carries the edge of each striking member in an arc of roughly two and one-half feet of vertical movement in each stroke. These operational characteristics coupled with the slapping action applied to the wires as a result have been found remarkably successful in removing grapes from the canes of grapevines trained along the trellis wires.

As can also be visualized in FIG. 4, when the panel 194 of a striking member 170 comes into contact with greater resistance in its path of movement than would normally be the case, the striking member operates automatically to avoid damage to itself and the object causing the resistance. This operational effect is achieved in the first instance by flexing of the rods. If the resistance is such that normal flexing of the rods is inadequate in itself, the striking member is forced downwardly against the rearward compression springs 180 to draw the forward portion 174 of the main plate 171 from rested engagement with the rollers 145 and terminate the slapping action of the striking member. These actions permit the panel 174 to slide under the obstruction to free itself. Thus, for example, where the panel contacts an arm portion 17 of a trellis 14, it simply slides under it preventing damage either to the arm portion or the striking member. Contributing to this sliding action is the shape and flat disposition of the panel. The troughs 199 of the panels operate to discharge any grapes from the panel which may fall thereon.

Therefore, the method and apparatus of the present invention operate to harvest fruit from row crops with little or no damage to the fruit, row crop, trellis, trellis wires, or apparatus while affording a convenience, efficiency and dependability not heretofore achieved.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An apparatus for harvesting crops from plants grown in a row and supported on a trellis wire or the like, the apparatus comprising a vehicle adapted for earth traversing movement along such a row of plants; a striking member having opposite first and second end portions; means mounting the striking member on the vehicle for reciprocal movement in opposite striking and return directions substantially about an axis between said first and second end portions of the striking member with said first end portion of the striking member disposed for engagement with the trellis wire during earth traversing movement of the vehicle along the row of plants; a cam assembly mounted on the vehicle on the opposite side of said axis from the first end portion of the striking member in position to be engaged by the second end portion of the striking member and operable by contact therewith to impart said reciprocal movement to the striking member; means for urging the second end portion of the striking member into engagement with the cam assembly with a force such as to maintain contact between the second end portion of the striking member and the cam assembly during said reciprocal movement until the striking member encounters a resistance force greater than that encountered by contact with the trellis wire and then to be overcome by the striking member encountering the resistance force to draw the second end portion of the striking member from the cam assembly; and means for operating the cam assembly to impart said reciprocal movement to the striking member whereby a repeated striking force is applied to the trellis wire by the striking member during movement of the vehicle along the row to dislodge the crops from the plants while minimizing damage resulting from contact of the striking member with objects affording greater resistance than the trellis wire.

2. The apparatus of claim 1 wherein said urging means includes a pair of springs mounted on the vehicle and connected to the striking member on opposite sides of said axis to confine the reciprocal movement of the striking member to a limited range.

3. The apparatus of claim 2 wherein the striking member between said axis and the first end portion includes a portion sufficiently flexible to accentuate the reciprocal movement transmitted therethrough to apply the first end portion to the trellis wire in a slapping action.

4. The apparatus of claim 1 wherein the striking member is mounted on the vehicle by the mounting means in position to pass beneath the trellis wire during said earth traversing movement of the vehicle along the row and for movement of the striking member in said reciprocal movement along a substantially vertical path in applying said striking force to the trellis wire.

5. The apparatus of claim 4 wherein the first end portion of the striking member terminates in an upwardly extending edge oriented to extend in substantially right angular relation to the trellis wire during said movement of the vehicle along the row and having a length for striking contact with a plurality of said trellis wires.

* * * * *

UNITED STATES PATENT AND TRADEMARK OFFICE
CERTIFICATE OF CORRECTION

PATENT NO. : 4,291,526

DATED : September 29, 1981

INVENTOR(S) : Kazuo Hiyama and Howard K. Hiyama

It is certified that error appears in the above-identified patent and that said Letters Patent are hereby corrected as shown below:

Column 5, line 21, between "plate" and "upstanding", insert ---in---.

Signed and Sealed this

Eighth Day of December 1981

[SEAL]

Attest:

GERALD J. MOSSINGHOFF

Attesting Officer

Commissioner of Patents and Trademarks